United States Patent [19]

Onoue

[11] Patent Number: 5,004,439

[45] Date of Patent: Apr. 2, 1991

[54] SPEED DETECTING DEVICE FOR MARINE PROPULSION UNIT

[75] Inventor: Akihiro Onoue, Hamamatsu, Japan

[73] Assignee: Sanshin Kogyo Kabushiki Kaisha, Hamamatsu, Japan

[21] Appl. No.: 469,219

[22] Filed: Jan. 24, 1990

[30] Foreign Application Priority Data

Jan. 24, 1989 [JP] Japan .................. 1-13076

[51] Int. Cl.⁵ .............................. G01P 5/16
[52] U.S. Cl. .......................... 440/2; 73/182
[58] Field of Search ............ 490/2; 116/62.1; 73/500, 488, 493, 502, 181–183

[56] References Cited

U.S. PATENT DOCUMENTS

| T981,002 | 4/1979 | Snyder | 73/182 |
| 4,622,850 | 11/1986 | Caffrie | 73/182 |
| 4,916,947 | 4/1990 | Suzuki | 73/182 |
| 4,932,249 | 6/1990 | Nakamura | 73/182 |

Primary Examiner—Joseph F. Peters, Jr.
Assistant Examiner—Clifford T. Bartz
Attorney, Agent, or Firm—Ernest A. Beutler

[57] ABSTRACT

A number of embodiments of marine outboard drives having conduitry for conveying a water pressure signal through the outboard drive housings to a remotely positioned indicator for speed indication. The conduitry of the outboard drive is formed by first and second conduits formed respectively in the lower and upper unit housings of the outboard drive and which communicate with each other upon assembly. A flexible conduit conveys the pressure signal from the second conduit to the remotely positioned indicator and one end of this flexible conduit is affixed to the upper unit housing before the housings are assembled together to provide a neat, compact and easily assembled arrangement.

7 Claims, 7 Drawing Sheets

SPEED DETECTING DEVICE FOR MARINE PROPULSION UNIT

BACKGROUND OF THE INVENTION

This invention relates to a speed detecting device for a marine propulsion unit and more particularly to an improved arrangement for transmitting a water pressure signal from a marine propulsion unit to a remotely positioned indicator.

A popular form of speed indicator for watercraft employs a system in which a water pressure signal is transmitted from the lower unit of the outboard drive to a remotely positioned transducer and indicator that gives a speed signal indication. The water pressure signal is derived from a forwardly facing inlet opening that is formed in the lower unit at a place below the normal water level. It is necessary, of course, to transmit this signal through the outboard drive unit and to the remotely positioned indicator. This is normally done by means of a conduit that is formed in the lower unit and which communicates with a flexible conduit that extends from the outboard drive unit to the remotely positioned indicator. Although these systems are quite advantageous, there are some disadvantages in the construction and operation of the prior art systems for transmitting the signal from the pressure sensing inlet to the remotely positioned indicator.

In one form of prior art construction, the conduitry is comprised of first and second conduits that are formed in the housings of the lower unit and upper unit of the marine outboard drive and which conduits communicate with each other when the housings are connected. However, with this form of construction it has been the practice to employ a flexible conduit that must be connected externally to the upper unit housing in communication with its conduit for conveying the water pressure signal to the remotely positioned indicator. This type of construction leaves the flexible conduit exposed where it might be damaged, provides a somewhat unsightly appearance and also requires some care in final assembly to make sure that the flexible conduit does not become damaged or kinked on final assembly.

Another form of construction employs a conduit that is formed in the lower unit housing with the flexible conduit being affixed directly to the lower unit housing and extending in part through the upper unit housing and then to the remote location. Although this type of construction has a neater appearance, it also requires a connection to be made through the outside of the upper unit housing so as to facilitate assembly and disassembly since the flexible conduit is normally formed from two interconnected portions that must be interconnected through the upper unit housing.

It is, therefore, a principal object of this invention to provide an improved conduit arrangement for transmitting a water pressure signal from a marine outboard drive to a remotely positioned indicator.

It is a further object of the invention to provide a conduit assembly of this type which minimizes the number of connections with must be made after the housing assemblies are connected to each other and which also conceals a major portion of the flexible conduit so as to avoid damage and improve neatness.

It is a further object of this invention to provide an improved, simplified and effective construction for transmitting a water pressure signal to a remotely positioned indicator from a marine outboard drive.

SUMMARY OF THE INVENTION

This invention is adapted to be embodied in a marine outboard drive that is comprised of a housing assembly comprising at least a lower unit housing containing a propulsion device and an upper unit housing containing a drive shaft for driving the propulsion device. The lower unit housing and the upper unit housing have respective surfaces facing each other and means secure the upper and lower unit housings to each other with the facing surfaces in abutment with each other. Conduit means are incorporated for conveying a water pressure signal from the outboard drive to a remotely positioned indicator. This conduit means comprises a first conduit section formed in the lower unit housing and extending from an inlet normally positioned below the water level and exposed externally of the lower unit housing to an outlet formed in the facing surface of the lower unit housing. A second conduit is formed in the upper unit housing and comprises an inlet formed in the facing surface of the upper unit housing and communicating with the first conduit outlet when the upper and lower unit housings are affixed to each other. The second conduit has an outlet formed internally within the upper unit housing and flexible conduit has its inlet end connected in communication with the second conduit outlet in a manner which permits the upper and lower unit housings to be assembled after the flexible conduit is in place. The outlet end of the flexible conduit conveys the pressure signal to the remotely positioned indicator.

DETAILED DESCRIPTION OF THE PREFERRED EMBODIMENTS OF THE INVENTION

Figure 1:
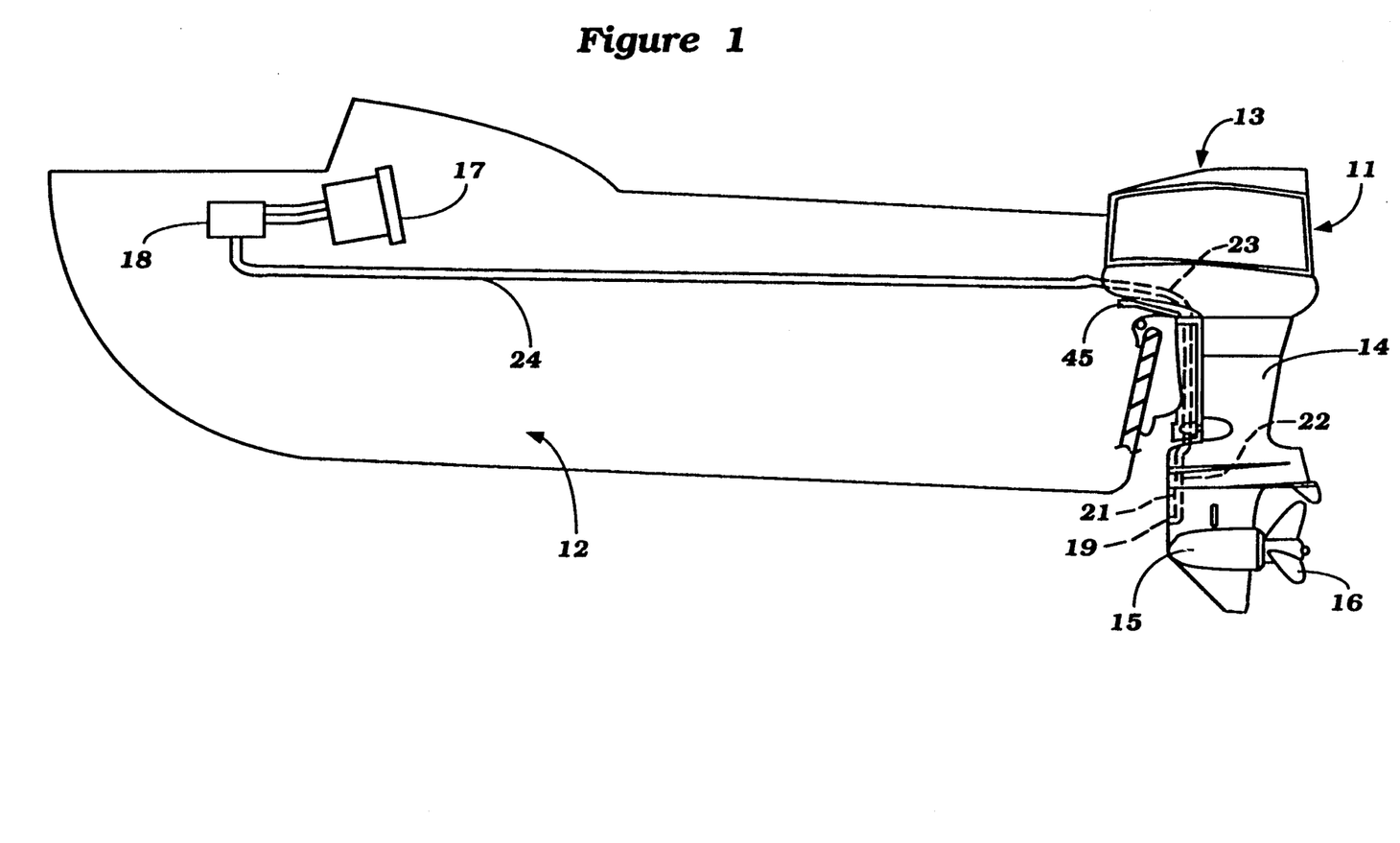
FIG. 1 is a side elevational view of a watercraft having a speed detecting device constructed in accordance with an embodiment of the invention.

FIG. 1 shows a typical environment in which the invention can be utilized wherein an outboard motor, indicated generally by the reference numeral 11 is attached to the transom of the hull of a watercraft 12 in a known manner. The invention is described in conjunction with an outboard motor but it is to be understood that the invention may be equally as well practiced with the outboard drive unit of an inboard/outboard drive.

For this reason, the term "marine outboard drive" is used generically herein and in the claims to describe either an outboard motor per se or the outboard drive portion of an inboard/outboard drive.

The outboard motor 11 includes a power head, indicated generally by the reference numeral 13 that contains an internal combustion engine of any known type and which drives a drive shaft (to be described later) that rotates about a vertically extending axis and which is journaled within a drive shaft housing 14 or upper unit of the outboard motor 11. This drive shaft then drives a transmission (also to be described later) that is contained within a lower unit housing 15 that is connected in a suitable manner to the upper unit or drive shaft housing 14. The transmission drives a propeller 16 in selected forward and reverse directions. Generally, the construction of the outboard motor 11 per se forms no part of the invention although the invention relates to the way in which certain conduitry, to be described, is accommodated and formed within the lower unit housing 15 and upper or drive shaft housing 14.

The watercraft 12 is provided with a speedometer 17 that is mounted within the rider's compartment on an instrument panel. The speedometer 17 includes a combined pressure transducer and indicator driver assembly 18 that receives a water pressure signal from a forwardly facing water inlet opening 19 formed in the lower unit 15 through a first conduit 21 formed in the lower unit housing 15, a second conduit 22 formed in the upper unit or drive shaft housing 14 and a flexible conduit 23. The flexible conduit 23 communicates with a conveying or conducting conduit 24 that transmits the water pressure signal to the transducer of the transducer driver assembly 18. This type of speedometer mechanism is well known and need not be described in further detail.

Figure 2:
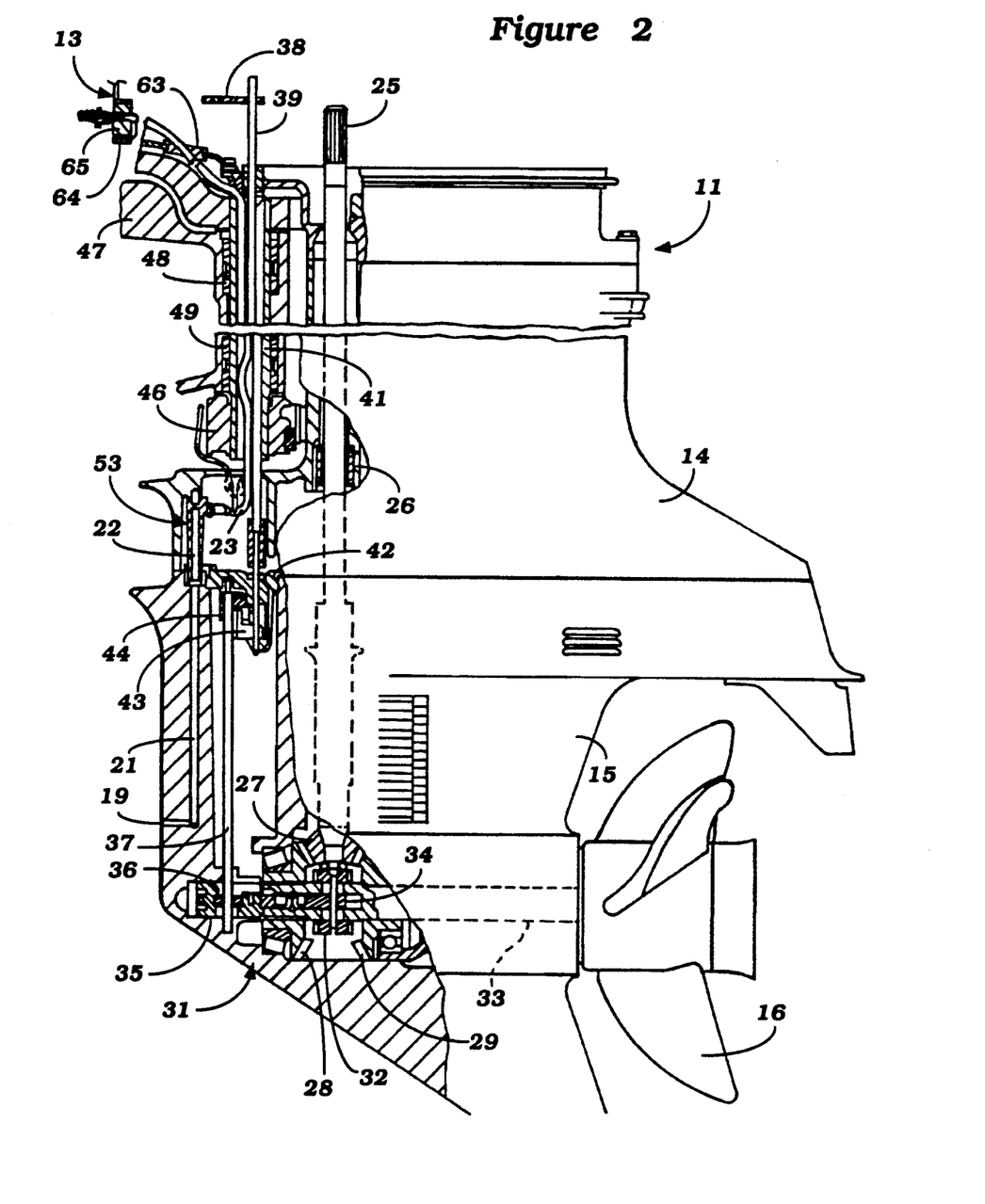
FIG. 2 is an enlarged side elevational view of a portion of the outboard drive unit, with parts broken away and other parts shown in section.
Figure 3:
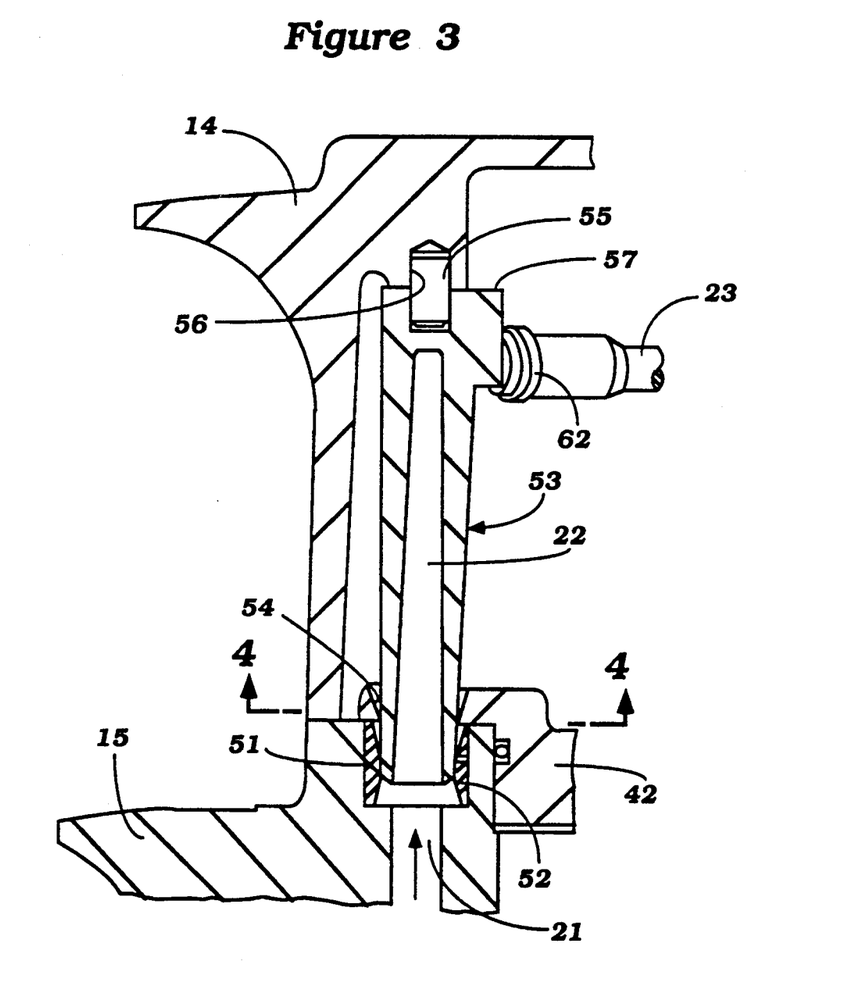
FIG. 3 is a further enlarged cross sectional view showing the interconnection between the upper and lower unit housings and the conduitry associated therewith.
Figure 4:
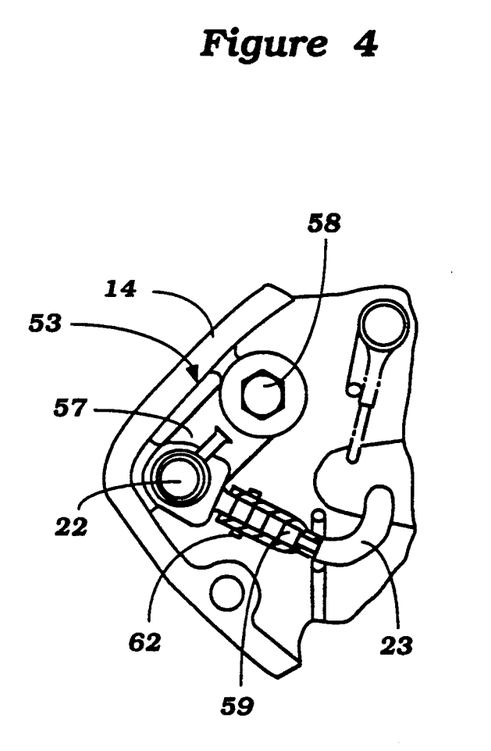
FIG. 4 is a view taken in the direction of the line 4—4 of FIG. 3.

Referring now primarily to FIGS. 2 through 4, the construction and operation of the conduits 21, 22 and 23 will be described in detail. However, before describing these components, certain additional components of the outboard motor will be described by particular reference to FIG. 2 so as to enable those skilled in the art to understand how the conduitry is associated with the components of the outboard drive. The housings 14 and 15 may be formed conveniently from castings of lightweight alloy material such as aluminum alloys. A drive shaft, previously referred to and indicated by the reference numeral 25 is journaled in the drive shaft or upper unit housing 14 in a suitable manner, as by means of an intermediate bearing 26 and depends into the lower unit housing 15. There is a driving bevel gear 27 affixed to the lower end of the drive shaft 25. This meshes with a pair of counterrotating bevel gears 28 and 29 of a conventional forward, neutral, reverse transmission, indicated generally by the reference numeral 31. This transmission also includes a dog clutching element 32 that is adapted to be selectively couple either of the gears 28 and 29 for rotation with a propeller shaft 33 to which the propeller 16 is affixed in a known manner. The dog clutching sleeve 32 is shifted by means of a plunger element 34 that is slidably supported within the propeller shaft 23 and which is operated by a shift cam follower 35. The shift cam follower 35 is, in turn, operated by a shift cam 36 that is connected to the lower end of a rotatably shift rod 37.

A shift lever 38 is affixed to the upper end of an upper shift rod 39 that passes through a steering shaft 41 that is affixed to the drive shaft housing 14 in a manner to be described. The shift lever 38 is connected to a remote actuator (not shown) for rotating the upper shift rod 39.

The upper shift rod 39 extends through a cover plate 42 that is clamped between the upper and lower unit housings 14 and 15 and carries an operating cam 43 at its lower end. This operating cam 43 operates a cam follower 44 that is affixed to the upper end of the lower shift rod 37 for rotating it and operating the shift mechanism in a known manner.

Figure 5:
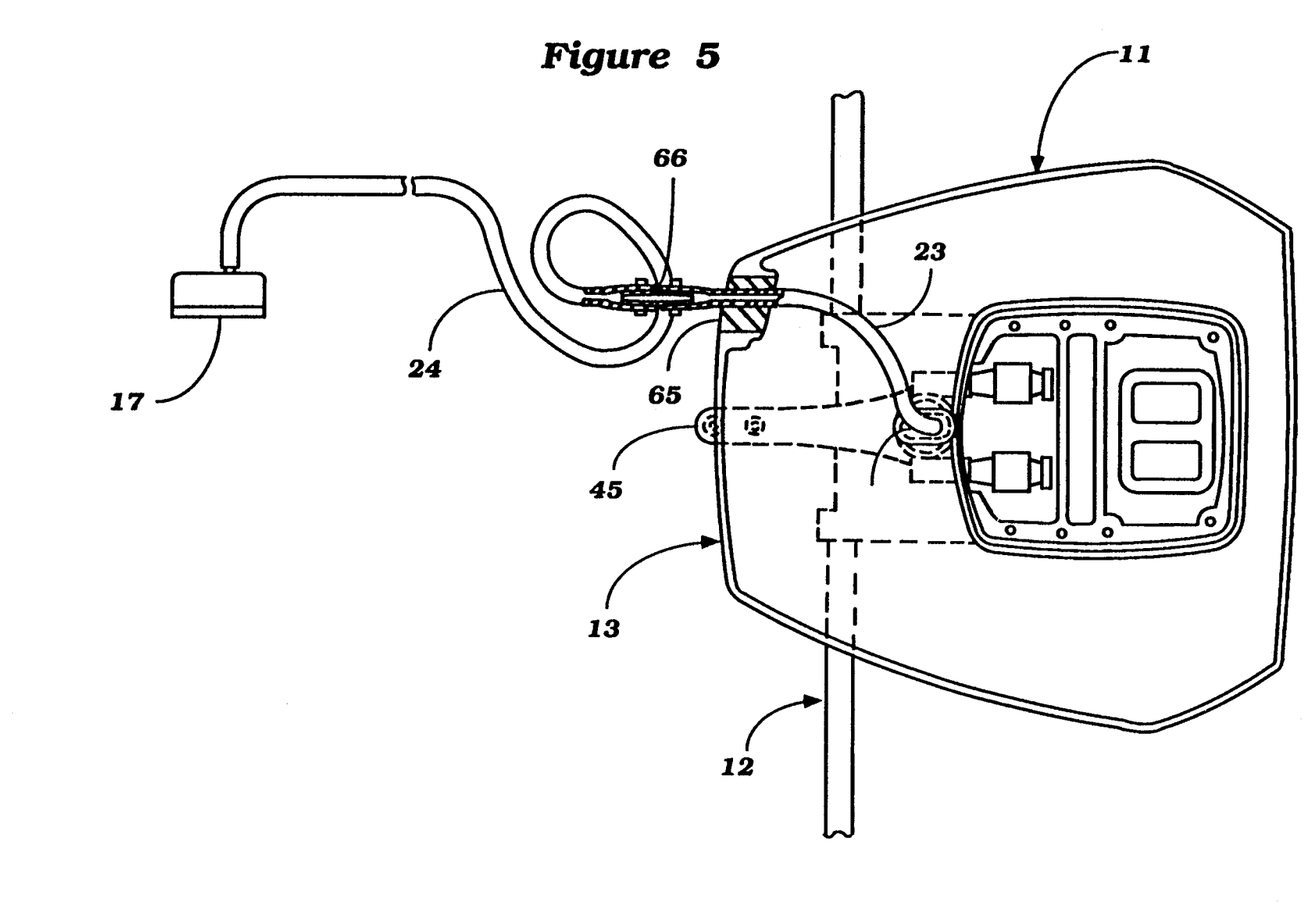
FIG. 5 is a top plan view showing the assembly, with portions broken away and other portions shown in section.

The steering shaft 41 has a steering arm or tiller 45 (FIGS. 1 and 5) affixed to it which is also adapted to be operated by a remotely positioned operator in a known manner for steering of the outboard motor 11. The steering shaft 41 is hollow and is affixed to the drive shaft housing 14 in a known manner by means including a lower support bracket 46. The steering shaft 41 is rotatably journaled in a swivel bracket 47 by means of upper and lower bearings 48 and 49 for steering of the outboard motor.

Referring now specifically to the construction of the conduitry 21, 22 and 23 (FIGS. 2 through 4), the lower unit housing 15 is formed with a horizontally extending passageway that extends from the opening 19 and which intersects the lower end of the passageway 21 which is formed directly in the housing of the lower unit 15. At the upper end of the passageway 21 and in a face of the lower unit housing 15 that faces and engages a corresponding face of the upper unit housing 14, there is provided a counter bore 51. An annular seal 52 is received in this counter bore and sealingly engages a lower portion of a conduit forming fitting 53 that is affixed, in a manner to be described, into the upper unit or drive shaft housing 14. The conduit 22 is formed by this fitting 53 and communicates with the lower housing conduit 21. The cover plate 42 is formed with a bore 54 that is tapered so as to receive and guide the fitting 53 into the seal 52.

At its upper end, the fitting 53 is provided with a bore that receives a locating pin 55. The pin 55 is also received in a bore 56 of the upper unit housing 14 so as to locate the upper end of the fitting 53. The pin 55 has a tighter fit in one of the bores than the other for locating and assembly purposes.

The fitting 53 has an arm portion 57 that has a bore at one end thereof so as to receive a threaded fastener such as a bolt 58 (FIG. 4) so that the fitting 53 can be attached to the upper unit or drive shaft housing 14 before this housing is assembled to the lower unit housing 15.

A nipple 59 is affixed to the upper end of the fitting 53 and has a passageway that intersects the upper end of the passageway 22. One end of the flexible conduit 23 is held onto the nipple 59 by means of a clamp 62. In this way, the flexible conduit 23 may be affixed to the fitting 53 through the lower surface of the housing 14 and then the fitting 53 with attached conduit 23 may be affixed to the drive shaft or upper housing 14. After this operation, this assembly is connected to the lower unit housing 15 by the known threaded fasteners. In this way, assembly is facilitated and it will be insured that a good seal exists between the conduit 21 formed in the lower unit housing 15 and the conduit 22 formed by the fitting 53 in the upper unit or drive shaft housing 14.

The flexible conduit 23 extends upwardly through the hollow interior of the steering shaft 41 and hence is not only concealed but is also protected against damage from underwater objects. At the upper end of the steering shaft 41, the flexible conduit 23 emerges and then passes through a sealing grommet 63 connected to a tray 64 of the cowling of the power head of the outboard motor. The conduit 23 further extends through this cowling of the power head and emerges through a grommet 65 positioned at a forward face of the protective cowling (FIG. 5) for attachment to the conveying conduit 24 by means of a connector 66. As a result, it should be readily apparent that the construction permits a neat appearance and one which can be easily assembled to insure good sealing.

Figure 6:
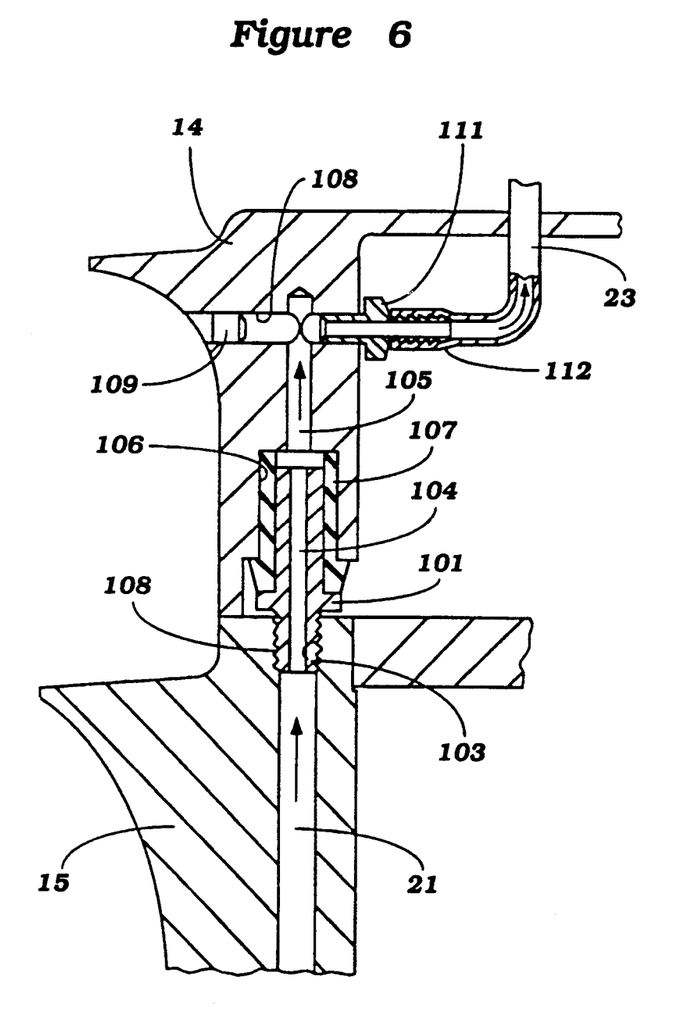
FIG. 6 is a cross sectional view, in part similar to FIG. 3, and shows another embodiment of the invention.

FIG. 6 shows another embodiment of the invention which differs from the embodiment of FIGS. 1 through 5 only in the way in which the conduit 21 of the lower unit housing 15 cooperates with the upper unit housing conduit and affords the connection to the flexible conduit 23. For that reason, only a description of this figure is necessary to understand the construction and operation of this embodiment.

In this embodiment, a fitting member 101 has a threaded lower portion 102 that is received in a tapped opening 103 formed at the upper end of the conduit 21 of the lower unit housing 15. The fitting 101 has a through passageway 104 for communicating with the lower unit housing conduit 21.

A conduit 105 is formed in the upper unit or drive shaft housing 14 and terminates at a counter bore 106 at its lower end. An elastic seal 107 is received in the counter bore 106 and sealingly engages the outer periphery of the fitting 101 when the lower unit housing 15 is assembled to the upper unit or drive shaft housing 14.

The conduit 105 is intersected by a cross drilled passageway 108 formed in the upper unit or drive shaft housing 14 and closed at its outer end by a plug 109. A fitting 111 is threaded into the passageway 108 and has a nipple 112 to which the flexible conduit 23 is affixed by a hose clamp or the like. As a result, this embodiment also permits the conduitry of the housings 14 and 15 to all be formed and assembled before the housings 14 and 15 are secured to each other. Hence, this embodiment has the same advantages as the previously described embodiments.

Figure 7:
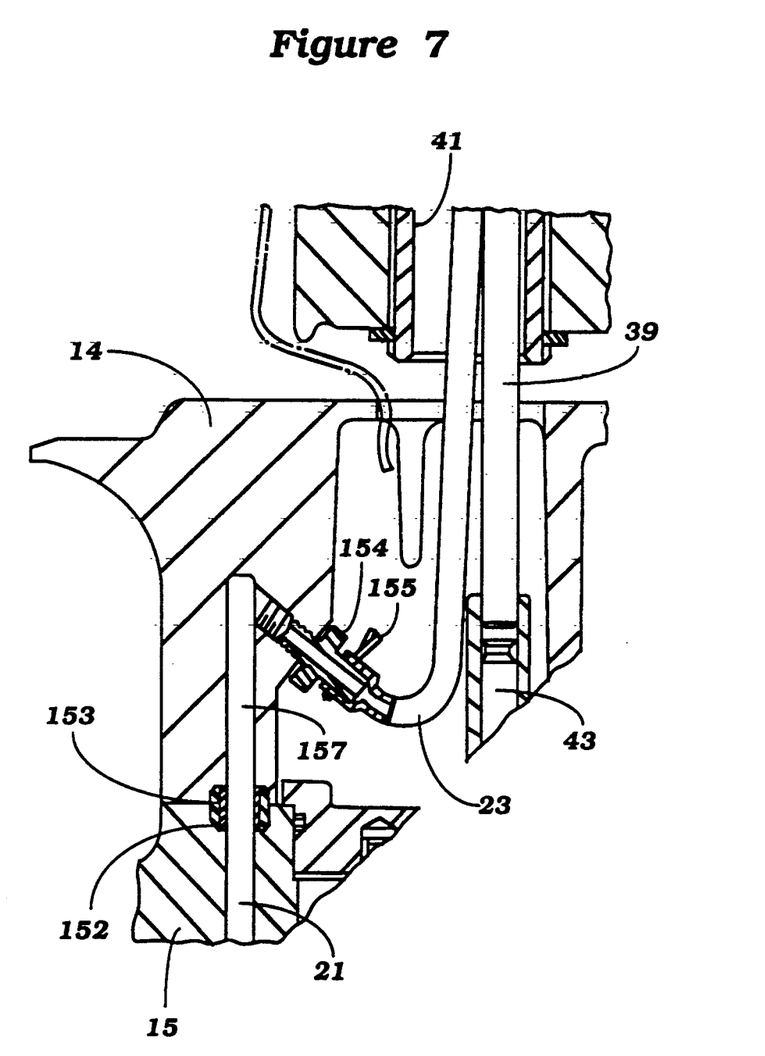
FIG. 7 is a cross sectional view, in part similar to FIGS. 3 and 6, and shows yet another embodiment of the invention.

FIG. 7 shows another embodiment of the invention that is similar to the previously described embodiments and differs from them only in the way that the conduitry is formed in the upper unit or drive shaft housing 14 and how the connection is made between the conduit 21 of the lower unit housing 15 and the flexible conduit 23. For that reason, only a description of this figure is necessary to understand the construction and operation of this embodiment.

In this embodiment, a drilled passageway 151 extends from the surface of the drive shaft housing 14 that faces the surface of the lower unit housing 15. A tube 152 has a rubber sealing ring 153 extending around it and is pressed into a counter bore formed in one of the housings 14 or 15 before assembly. This tube 153 will then seal in a corresponding counter bore formed in the other of the housings when the two housings are affixed to each other so as to complete the connection upon assembly, as with the previously described embodiments. In this embodiment, a fitting 154 is threaded into the housing 14 before assembly and the flexible conduit 23 is affixed to this fitting before assembly by means of a hose clamp 155.

It should be readily apparent from the foregoing description that a number of conduit constructions have been described, each of which permits ease of assembly, a neat appearance, and the assembly of the flexible conduit to the drive shaft or upper unit housing 14 before the lower unit housing 15 is assembled to this housing. In addition, the communication between the conduits of the upper and lower unit housings is such that it is automatically effected when the housings 14 and 15 are affixed to each other in the normal manner.

The foregoing descriptions are, of course, only those of preferred embodiments of the invention. Various changes and modifications may be made without departing from the spirit and scope of the invention, as defined by the appended claims.

I claim:

1. A marine outboard drive comprised of a housing assembly comprised of at least a lower unit housing containing a propulsion device and an upper unit housing containing a drive shaft for driving said propulsion device, said lower unit housing and said upper unit housing having respective surfaces facing each other, means for securing said lower unit housing and said upper unit housing to each other with said surfaces in abutment with each other, and conduit means for conveying a water pressure signal from said outboard drive to a remotely positioned indicator comprising a first conduit section formed in said lower unit housing and extending from an inlet normally positioned below the water line and exposed externally of said lower unit housing to an outlet formed in the surface of said lower unit housing, a second conduit section formed in said upper unit housing and comprised of an inlet formed in said surface of said upper unit housing and communicating with said first conduit outlet when said upper and lower unit housings are affixed together, said second conduit having an outlet formed internally within said upper unit housing, and a flexible conduit having its inlet end connected in communication with said second conduit opening in a manner which permits said upper and said lower unit housings to be assembled when said flexible conduit is in place, the outlet end of said flexible conduit conveying the pressure signal to the remotely positioned indicator.

2. A marine outboard drive as set forth in claim 1 wherein the flexible conduit extends through the upper unit housing and emerges at a point above the water level.

3. A marine outboard drive as set forth in claim 2 further including a hollow steering shaft affixed to said upper unit housing and through which at least a portion of the flexible conduit extends.

4. A marine outboard drive as set forth in claim 1 wherein the first conduit is formed by passages formed directly in the lower unit housing.

5. A marine outboard drive as set forth in claim 4 wherein the connection between the first conduit and the second conduit is formed by a fitting that is affixed to one of the housings and which has at least a portion of one of the conduits formed therein.

6. A marine outboard drive as set forth in claim 5 wherein the flexible conduit is affixed directly to the fitting.

7. A marine outboard drive as set forth in claim 5 wherein the fitting is affixed to the lower unit housing and is in sealing engagement with the second conduit which second conduit is formed by a passage in the upper unit housing.

* * * * *